US008500544B2

(12) United States Patent
Bienvenue

(10) Patent No.: US 8,500,544 B2
(45) Date of Patent: Aug. 6, 2013

(54) KENO SIMULATION OF OTHER GAME OUTCOMES

(75) Inventor: Lesley Bienvenue, Reno, NV (US)

(73) Assignee: IGT, Reno, NV (US)

( * ) Notice: Subject to any disclaimer, the term of this patent is extended or adjusted under 35 U.S.C. 154(b) by 1600 days.

(21) Appl. No.: 11/339,234

(22) Filed: Jan. 24, 2006

(65) Prior Publication Data

US 2007/0173313 A1 Jul. 26, 2007

(51) Int. Cl.
*A63F 13/00* (2006.01)

(52) U.S. Cl.
USPC .................................. 463/21; 463/18; 463/19

(58) Field of Classification Search
USPC .......................................... 463/12, 13, 18–23
See application file for complete search history.

(56) References Cited

U.S. PATENT DOCUMENTS

| | | | | |
|---|---|---|---|---|
| 3,671,041 | A | 6/1972 | Taylor et al. | |
| 4,332,389 | A | 6/1982 | Loyd, Jr. et al. | |
| 4,365,810 | A | 12/1982 | Richardson | |
| 4,373,726 | A | 2/1983 | Churchill et al. | |
| 4,455,025 | A | 6/1984 | Itkis | |
| 4,624,462 | A | 11/1986 | Itkis | |
| 4,798,387 | A | 1/1989 | Richardson | |
| 4,848,771 | A | 7/1989 | Richardson | |
| 4,856,787 | A | 8/1989 | Itkis | |
| 5,007,649 | A | 4/1991 | Richardson | |
| 5,192,076 | A | 3/1993 | Komori | |
| 5,242,163 | A | 9/1993 | Fulton | |
| 5,297,802 | A | 3/1994 | Pocock et al. | |
| 5,351,970 | A | 10/1994 | Fioretti | |
| 5,393,057 | A | 2/1995 | Marnell, II | |
| 5,639,088 | A | 6/1997 | Schneider et al. | |
| 5,833,540 | A | 11/1998 | Miodunski et al. | |
| 6,012,984 | A | 1/2000 | Roseman | |
| 6,068,552 | A * | 5/2000 | Walker et al. | 463/21 |
| 6,089,978 | A | 7/2000 | Adams | |
| 6,093,100 | A | 7/2000 | Singer et al. | |
| 6,149,156 | A | 11/2000 | Feola | |

(Continued)

FOREIGN PATENT DOCUMENTS

| | | |
|---|---|---|
| WO | WO 01/99067 | 12/2001 |
| WO | WO 03/085613 | 10/2003 |

(Continued)

OTHER PUBLICATIONS

US Office Action mailed Nov. 25, 2008 issued in 11/402,726.

(Continued)

*Primary Examiner* — Omkar Deodhar
*Assistant Examiner* — Eric M Thomas
(74) *Attorney, Agent, or Firm* — Neal, Gerber & Eisenberg LLP

(57) ABSTRACT

Some implementations of the invention provide a Keno game on a gaming machine wherein an outcome of a second game is also presented. The second game may be a Class III game such as a slot game, a video poker game, etc. Some such aspects of the invention involve providing a Keno game in which the Keno card is divided into N areas and a single number within each of the N areas is selected for the Keno game. Other aspects of the invention provide methods of populating a pay table of another game with outcomes of a Keno game.

21 Claims, 11 Drawing Sheets

U.S. PATENT DOCUMENTS

| | | | | |
|---|---|---|---|---|
| 6,159,095 | A * | 12/2000 | Frohm et al. | 463/19 |
| 6,183,361 | B1 | 2/2001 | Cummings et al. | |
| 6,280,325 | B1 | 8/2001 | Fisk | |
| 6,315,291 | B1 * | 11/2001 | Moody | 273/139 |
| 6,524,185 | B2 | 2/2003 | Lind | |
| 6,537,150 | B1 * | 3/2003 | Luciano et al. | 463/16 |
| 6,569,017 | B2 | 5/2003 | Enzminger et al. | |
| 6,656,040 | B1 * | 12/2003 | Brosnan et al. | 463/16 |
| 6,656,044 | B1 | 12/2003 | Lewis | |
| 6,802,776 | B2 | 10/2004 | Lind et al. | |
| 6,840,858 | B2 | 1/2005 | Adams | |
| 2002/0113369 | A1 | 8/2002 | Weingardt | |
| 2002/0132661 | A1 | 9/2002 | Lind et al. | |
| 2003/0125101 | A1 | 7/2003 | Campo | |
| 2004/0053682 | A1 * | 3/2004 | Nelson et al. | 463/25 |
| 2004/0072619 | A1 * | 4/2004 | Brosnan et al. | 463/42 |
| 2004/0204224 | A1 * | 10/2004 | Finnochio | 463/18 |
| 2005/0014553 | A1 * | 1/2005 | Byrne | 463/18 |
| 2005/0037832 | A1 * | 2/2005 | Cannon | 463/18 |
| 2005/0233798 | A1 | 10/2005 | Van Asdale | |
| 2006/0046816 | A1 * | 3/2006 | Walker et al. | 463/13 |
| 2007/0155471 | A1 | 7/2007 | Powell et al. | |
| 2007/0155472 | A1 | 7/2007 | Gail et al. | |
| 2007/0155473 | A1 | 7/2007 | Powell et al. | |
| 2007/0161423 | A1 | 7/2007 | Bienvenue et al. | |
| 2007/0173313 | A1 | 7/2007 | Bienvenue | |

FOREIGN PATENT DOCUMENTS

| | | |
|---|---|---|
| WO | WO2004/095383 | 4/2004 |
| WO | WO2007/075401 | 7/2007 |
| WO | WO2007/075486 | 7/2007 |
| WO | WO2007/075582 | 7/2007 |
| WO | WO2007/078828 | 7/2007 |

OTHER PUBLICATIONS

International Preliminary Report on Patentability and Written Opinion dated Aug. 8, 2007, issued in WO2007/075401.

International Preliminary Report on Patentability and Written Opinion dated Jul. 5, 2007, issued in WO2007/075486.

International Preliminary Report on Patentability and Written Opinion dated Jul. 4, 2007, issued in WO2007/078828.

International Preliminary Report on Patentability and Written Opinion dated Jun. 6, 2007, issued in WO2007/075582.

International Search Report, mailed Jun. 6, 2007 from International App No. PCT/US2006/048264, 5 pp. including Notification of Transmittal.

Written Opinion of the International Searching Authority mailed Jun. 6, 2007 from International App No. PCT/US2006/048264, 7 pp.

International Search Report of the International Searching Authority, mailed Jul. 4, 2007 from International Application No. PCT/US2006/047714, 5 pp. including Notification of Transmittal.

Written Opinion of the International Searching Authority, mailed Jul. 4, 2007 from International Application No. PCT/US2006/047714, 6 pp. including Notification of Transmittal.

International Search Report of the International Searching Authority dated Jul. 5, 2007, for related PCT Application No. PCT/US2006/048064, 5 pp. including Notification of Transmittal.

Written Opinion of the International Searching Authority dated Jul. 5, 2007, for related PCT Application No. PCT/US2006/048064, pp. 6.

International Search Report mailed Aug. 8, 2007, from International Application No. PCT/US2006/047887, 5 pp. including Notification of Transmittal.

Written Opinion of the International Searching Authority, mailed Aug. 8, 2007 from International Application No. PCT/US2006/047887, 7 pp.

* cited by examiner

*Fig. 5A*
500
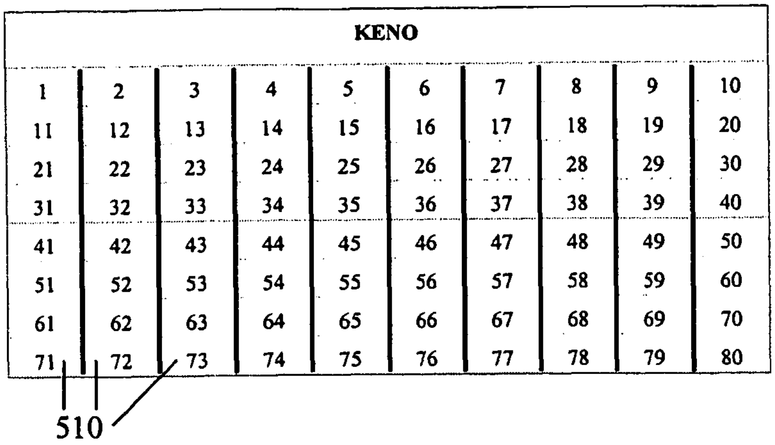
550
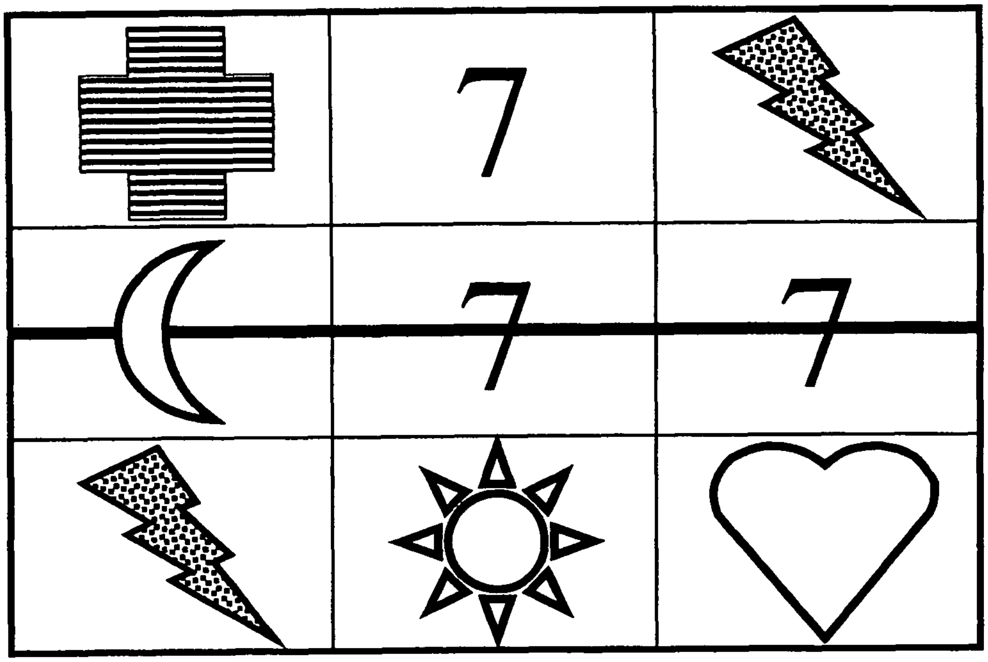
*Fig. 5B*

*Fig. 6A*
500
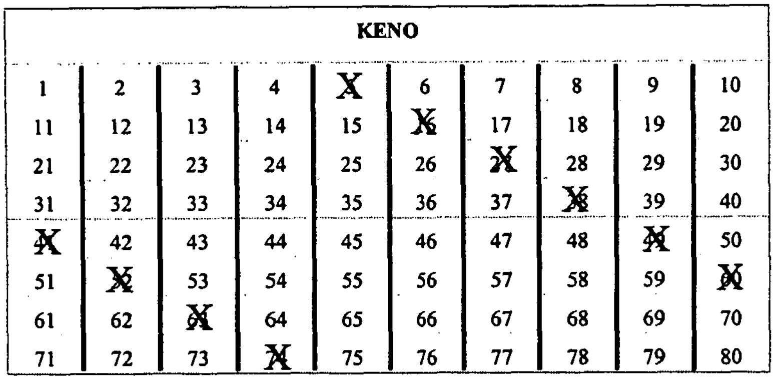
550
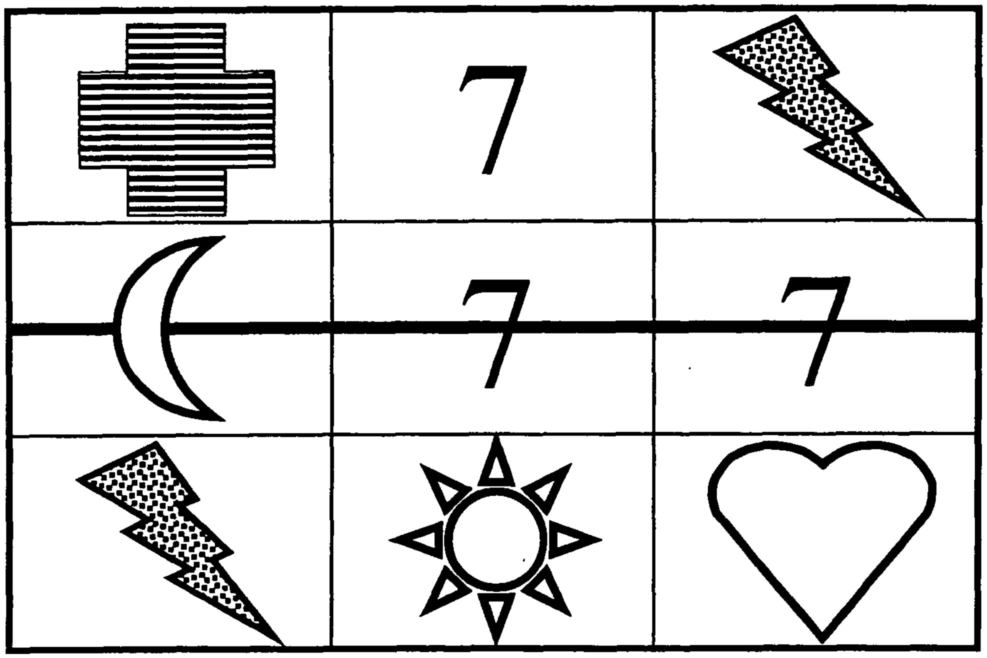
*Fig. 6B*

500

550

KENO SIMULATION OF OTHER GAME OUTCOMES

FIELD OF THE INVENTION

This application relates generally to games of chance, particularly games of chance provided on electronic gaming machines.

BACKGROUND OF THE INVENTION

Keno is a game that is similar to Lotto. Keno is a very popular game and relatively easy to play. Moreover, Keno offers the possibility of winning large payouts on relatively small wagers.

The traditional game of Keno uses 80 numbered balls. For every game, the house draws 20 balls at random and displays their numbers on screens (sometimes called "Keno boards") located throughout the gaming establishment, e.g., the casino. The object of Keno is for the player to guess at least some of the numbers the house will draw. Players indicate which numbers they have selected by marking them on a Keno card. Each correct guess is termed a "catch."

A simple Keno card 100 is illustrated in FIG. 1. To play a standard Keno game, a player marks selected numbers or "spots" 105 on the Keno card, often by using a "Keno crayon" that is provided by the casino. The numbers of spots 105 correspond with the balls to be drawn. A casino will often establish a maximum number of spots that a play may select (e.g., 15) for a particular Keno game or "race." The more spots played, the more the player must catch in order to win.

In the example shown in FIG. 1, a player has decided to play a $1 6-spot, meaning that the player intends to bet $1 and has chosen 6 numbers by crossing them out with an "X." In the right side of Keno card 100, the player has written "$1" and beneath that the number 6 to indicate that the player is playing a 6-spot. The player (or a Keno "runner") will then bring Keno card 100 and the wager to a dealer (also called a "writer") in a Keno lounge. The dealer will make a copy of Keno card 100 and will return the copy and keep the original.

After the rest of the players are served (or after a predetermined time), the house will declare the game closed. The 80 Keno balls are mixed in a hopper, portals of the hopper are opened and balls will begin to work their way out through the portals. A dealer will call out the number of each ball that emerges and will throw a switch to cause the corresponding number to light on a keno board. After the 20th Keno ball has emerged and the corresponding number is lit on the keno board, the race is complete. Casinos generally require winning tickets to be cashed immediately after the game.

Various alternative versions of Keno may be played, one of which will now be described with reference to Keno card 200 of FIG. 2. This version and other versions of Keno could also be played on a simpler Keno card such as Keno card 100. As in the previous example, a player has marked 6 spots of Keno card 200. However, the player has also circled groups 206 and 208, having 3 spots each. Moreover, the player has also indicated "⅔" and "⅙" in box 210. This signifies that the player wishes to play 3 different "ways." The notation "⅔" indicates that the player is playing two 3 spots, as shown by groups 206 and 208. The "⅙" means the player is also playing a 6 spot formed by combining the spots in groups 206 and 208. Here, the player has indicated 1 game (box 215) played 3 ways (box 210). Accordingly, the $3 price per game (box 220) is the same amount as the indicated total price (box 225). Those of skill in the art will realize that there are various other methods of playing combinations and/or multiple ways and of placing the associated wagers.

Gaming machines such as slot machines and video poker machines have proven to be very popular. Some such gaming machines are configured to present games of Keno. Players may use input devices of a gaming machine to select spots, determine payouts, make wagers, etc. Electronic Keno games generally do not require players to wait until other players have placed their bets, but instead allow players to determine the selected Keno numbers almost immediately after placing their bet and selecting their spots. Although Keno is a popular and interesting game, it would be desirable to make Keno more entertaining for players.

SUMMARY OF THE INVENTION

Some implementations of the invention provide a Keno game on a gaming machine wherein an outcome of a second game is also presented. The second game may be a Class III game such as a slot game, a video poker game, etc. Some such aspects of the invention involve providing a Keno game in which the Keno card is divided into N areas and a single number within each of the N areas is selected for the Keno game. Other aspects of the invention provide methods of populating a pay table of another game with outcomes of a Keno game.

For example, some implementations of the invention provide a method of populating a pay table that includes the following steps: determining N areas of a Keno card for a Keno game in which players can select only one number in each of the N areas; determining a probability for each unique Keno outcome of the Keno game; determining a first pay table probability corresponding to a first win amount and a first outcome of a pay table for a second game; selecting a first plurality of unique Keno outcomes whose total probability is approximately equal to the first pay table probability; and mapping the first plurality of unique Keno outcomes to the first win amount and the first outcome of the pay table for the second game. In some such implementations, each unique Keno outcome of the first plurality of unique Keno outcomes has approximately the same probability. The second game may be, for example, a slot game or a video poker game.

According to some such implementations, the pay table for the second game comprises O outcomes and the method also includes these steps: determining $2^{nd}$ through O pay table probabilities corresponding to $2^{nd}$ through O win amounts and $2^{nd}$ through O outcomes of the pay table for the second game; selecting $2^{nd}$ through O pluralities of unique Keno outcomes whose total probabilities are approximately equal to the corresponding $2^{nd}$ through O pay table probabilities; and mapping the $2^{nd}$ through O pluralities of unique Keno outcomes to the $2^{nd}$ through O win amounts and the $2^{nd}$ through O outcomes of the pay table for the second game. Some such implementations also include the steps of determining unmapped unique Keno outcomes that were not mapped to win amounts of the second game and assigning the unmapped unique Keno outcomes to zero win amounts for the second game.

The method may also include the steps of determining a hit/miss probability for each of N+1 hit/miss outcomes, wherein each hit/miss outcome corresponds to a condition of having a hit or a miss on 0 through N of the areas of the Keno card, and organizing the probabilities for the unique Keno outcomes according to the N+1 hit/miss outcomes. The method may include the step of ranking the N+1 hit/miss outcomes according to their relative probability. The selecting step may involve selecting the first plurality of unique Keno outcomes from a rank that corresponds with a relative probability of the first outcome of the second game.

Alternative implementations of the invention provide a gaming method that includes these steps: providing a Keno game wherein a Keno card is divided into N areas and a number is selected in each of the N areas; and displaying a second game outcome that corresponds with an outcome of the Keno game. The Keno game and the second game may be provided on a gaming machine. The second game may be, for example, a slot game or a video poker game.

In some such implementations, a player selects one number in each of the N areas. Alternatively, one number may be automatically selected in each of the N areas. N may be, e.g., 10, 16, 20, or some other convenient number.

The methods described herein may be implemented, at least in part, by software, hardware and/or firmware of a gaming machine and/or devices in communication with a gaming machine. The present invention provides other hardware (such as host devices, network devices and components thereof) configured to perform the methods of the invention, as well as software and/or firmware to control such devices to perform these methods.

Alternative embodiments of the invention provide a gaming machine that includes the following elements: a credit-accepting device for accepting indicia of credit; at least one display device; at least one input device; and a logic device. The logic device is configured to perform the following steps after receiving an indication from the credit-accepting device indicating that sufficient indicia of credit have been received: control a display device to present a Keno card, to prompt a player to choose one Keno number in each of N areas of the Keno card and to indicate chosen Keno numbers on the Keno card; determine a Keno game outcome and a corresponding outcome of a second game of chance; control a display device to indicate Keno numbers of the Keno game outcome on the Keno card; and control a display device to indicate the corresponding outcome of the second game of chance. The second game of chance may be, e.g., a slot game or a poker game.

An input device may be configured to allow a player to choose one Keno number in each of the N areas of the Keno card. Alternatively (or additionally), a logic device may be configured to choose randomly one Keno number in each of the N areas of the Keno card. For example, an input device may be configured to allow a player to instruct the logic device to automatically choose one Keno number in each of the N areas of the Keno card.

The gaming machine may include a first display device and a second display device. In some such embodiments, the Keno card may be displayed on the first display device and the second game of chance may be displayed on the second display device.

These and other features of the present invention will be presented in more detail in the following detailed description of the invention and the associated figures.

BRIEF DESCRIPTION OF THE DRAWINGS

FIGS. 5A and 5B illustrate an exemplary Keno card display and an exemplary slot display at a first time, according to one method of the invention.

FIGS. 6A and 6B illustrate an exemplary Keno card display and an exemplary slot display at a second time.

DESCRIPTION OF PREFERRED EMBODIMENTS

In this application, numerous specific details are set forth in order to provide a thorough understanding of the present invention. It will be obvious, however, to one skilled in the art, that the present invention may be practiced without some or all of these specific details. In other instances, well known process steps have not been described in detail in order not to obscure the present invention. Moreover, the steps of at least some of the methods described herein are not necessarily performed in the order indicated.

Gaming in the United States is divided into Class I, Class II and Class III games. Class I gaming includes social games played for minimal prizes, or traditional ceremonial games. Class II gaming includes bingo and bingo-like games. Class II gaming may also include pull tab games if played in the same location as bingo games, lotto, punch boards, tip jars, instant bingo, and other games similar to bingo. Class III gaming includes any game that is not a Class I or Class II game, such as games of chance typically offered in non-Indian, state-regulated casinos.

Some implementations of the invention provide a Keno game on a gaming machine wherein an outcome of a second game is also presented. The second game may be a Class III game such as a slot game, a video poker game, etc. It is expected that players' excitement will be enhanced by the presentation of the second game outcome, which in some implementations will occupy a larger area than the display of the Keno outcome.

Preferred aspects of the invention involve providing a Keno game in which the Keno card is divided into N areas and a single number within each of the N areas is selected for the Keno game. In some implementations N is 20, but N may be another number such as 8, 10, 16 or 40.

Figure 3:
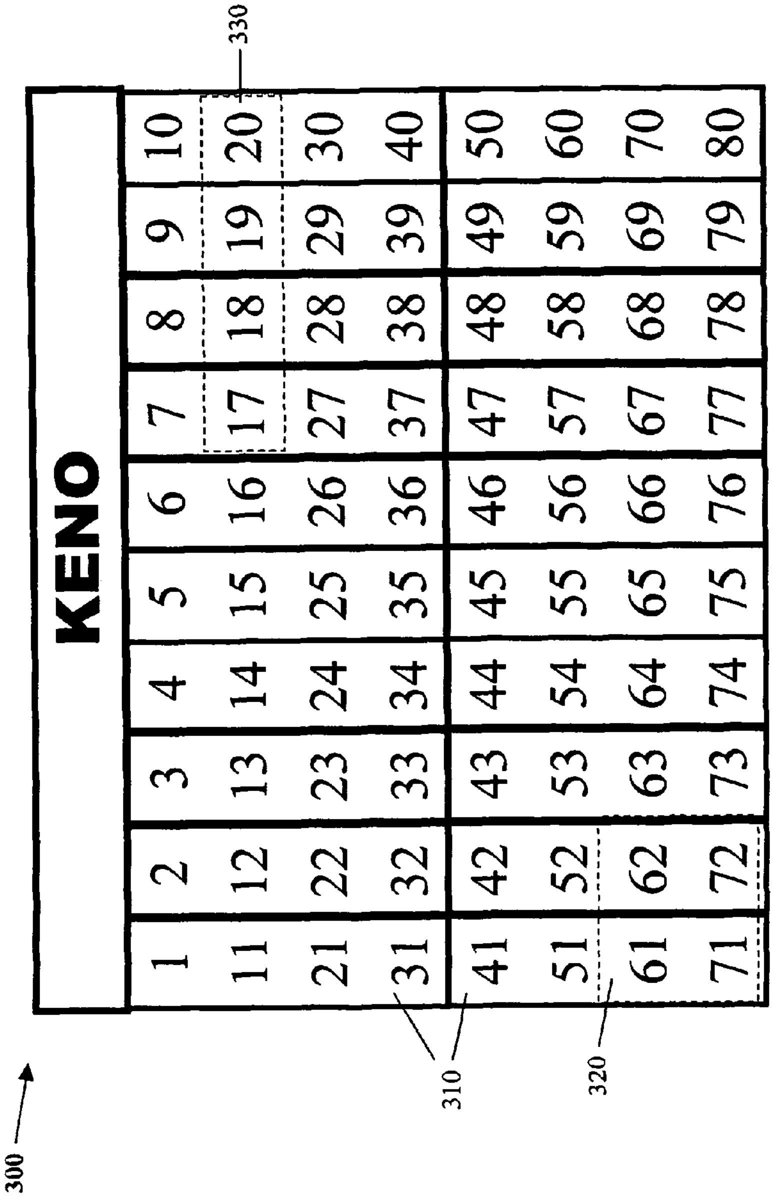
FIG. 3 provides an example of a Keno card that may be used according to some aspects of the invention.

FIG. 3 illustrates exemplary Keno card 300 that may be used to implement some features of the invention. In this example, "N" equals 20: Keno card 300 arranges 80 Keno numbers into 20 areas 310. According to some implementations of the invention, a player would be required to choose one and only one Keno number in each of the 20 areas 310.

The groupings shown in FIG. 3 are purely illustrative. Other 20-area Keno cards could group numbers differently, e.g., as shown by areas 320 and 330. Yet other implementations involve 8-area Keno cards having 10 Keno numbers per area, 10-area Keno cards having 8 Keno numbers per area, 16-area Keno cards having 5 Keno numbers per area and 40-area Keno cards having 2 Keno numbers per area.

Many other Keno number arrangements and groupings may be used within the scope of the invention. For example, while Keno cards have traditionally illustrated Keno numbers grouped in a rectangle, other shapes (e.g., triangle, diamond, circle, oval, rhombus, parallelogram) may be used for the overall arrangement of the Keno numbers. Moreover, some implementations of the invention involve Keno games in which there are more or fewer than 80 Keno numbers. Some such implementations involve randomly selecting more or fewer than 20 of these Keno numbers.

Figure 4:
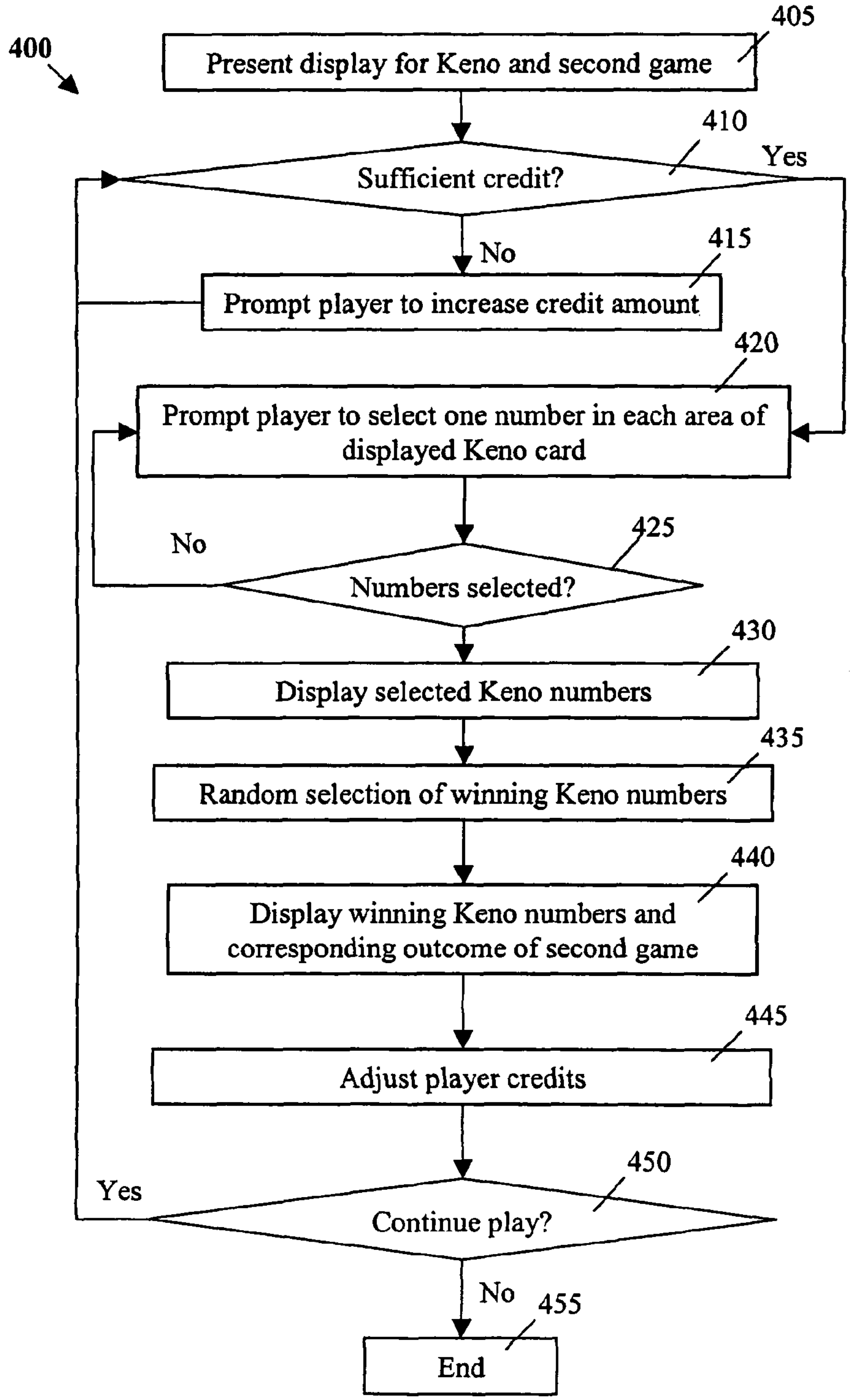
FIG. 4 is a flow chart that outlines a method of the invention.
Figure 7A:
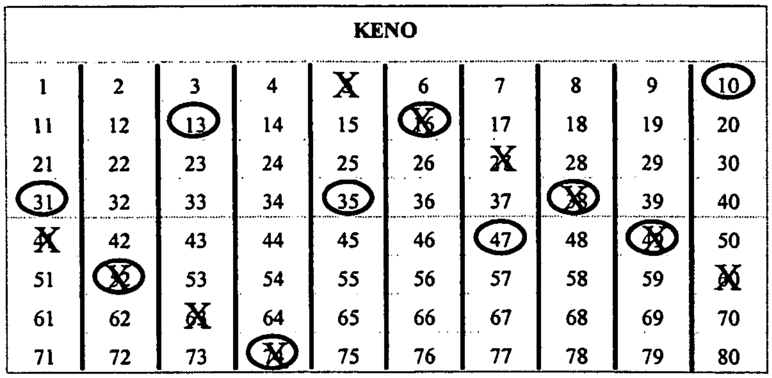
FIGS. 7A and 7B illustrate an exemplary Keno card display and an exemplary slot display at a third time.
Figure 7B:
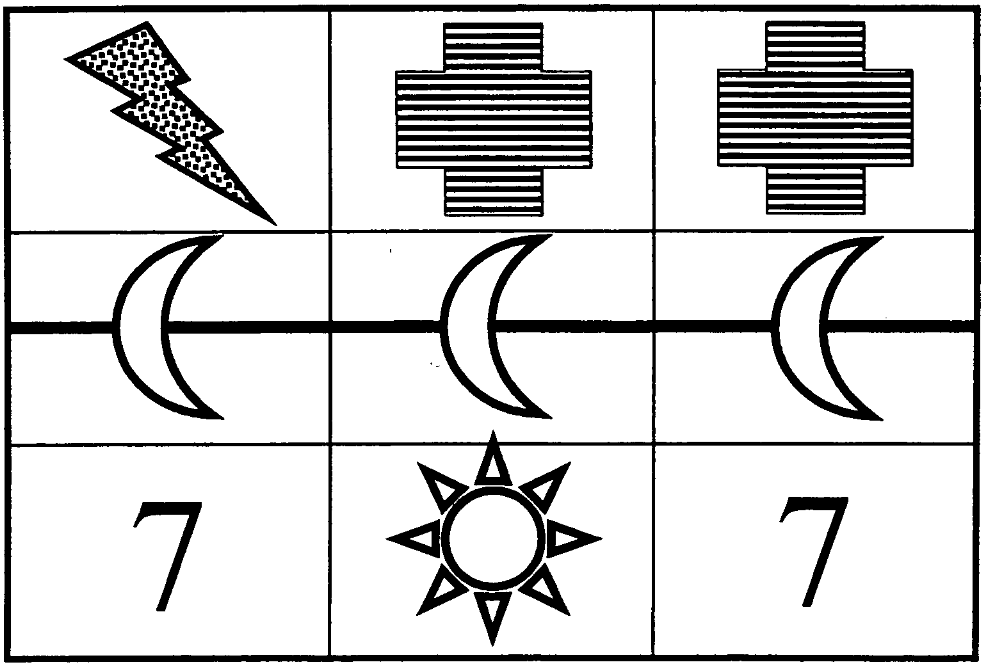

An exemplary game provided by the present invention will now be described with reference to the flow chart of FIG. 4 and the exemplary displays of FIGS. 5A through 7B. Referring first to FIG. 4, in step 405 displays are presented for a Keno game and a second game, which is a slot game in this example.

Exemplary Keno display 500 and slot display 550 are shown in FIGS. 5A and 5B, respectively. Keno display 500 and slot display 550 may be presented on the same display device or on separate display devices of a gaming machine or a similar device. For example, a logic device of a gaming machine may control one or more displays to present Keno display 500 and slot display 550, according to instructions from gaming software. Keno display 500 may be smaller or larger than slot display 550; in some implementations of the invention, Keno display 500 is significantly smaller than slot display 550.

Here, Keno display 500 and slot display 550 are shown in a condition prior to the beginning of a game; Keno display 500 indicates no spots have been selected for the next game, whereas slot display 550 indicates the result of the last game. In this example, the displayed Keno card is a 10-area card (N=10) with the areas presented in separate columns. However, as mentioned above, various other values of N, patterns and groupings of Keno numbers may be used.

In step 410, it is determined (e.g., according to indications from a bill acceptor or a similar device, as described elsewhere herein) whether sufficient credit has been made available to play a game. If not, the player is prompted (e.g., with a visual and/or audio prompt) to increase the credit available. (Step 415.) For example, the player may be encouraged to insert currency or other indicia of credit into the gaming machine.

When it is determined that sufficient credit is available, the player is prompted to select one number in each area 510 of the Keno display 500. (Step 420.) The player may have the option of selecting a number within each of the N areas, as shown in FIG. 6A. Preferably, the player is only allowed to select one number in each of the N areas: for example, if the player attempts to select more than one number in the same area, a previously-selected number may be "de-selected" and the corresponding indication (in this example, the "X") will be removed. Alternatively, the player may be able to use an input device (e.g., a button or other input device of a gaming machine, as described elsewhere herein) to cause the numbers to be selected automatically (e.g., by a logic device performing an algorithm for generating a random number).

In step 425, it is determined whether a number has been selected in each area 510 of the Keno display 500. If not, the process returns to step 420. If so, the selected Keno numbers are displayed (step 430) and winning Keno numbers are randomly selected (step 435). It will be appreciated that the selected Keno numbers are preferably displayed with an indication that they have been selected (here, with an "X") as soon as the selection is made. In some implementations, the player will be prompted to take an action (e.g., to press a "Play" button or the like) before the winning numbers are selected, just to ensure that the player has made his or her final selection.

In step 440, the winning Keno numbers and the corresponding outcome of the second game are displayed. In the example depicted in FIG. 7A, the winning Keno numbers are depicted with an oval in Keno display 500. Here, the player has been very fortunate and has 5 hits out of 10 numbers chosen. Accordingly, a winning combination of 3 moons is depicted in corresponding slot display 550, shown in FIG. 7B.

Other indications of the win are preferably made, such as those indications known by those of skill in the art. For example, a characteristic display of flashing lights, an audio clip (e.g., of coins being dispensed) and/or a video clip, etc., may be presented. The player's credits are adjusted accordingly in step 445.

In step 450, it will be determined whether the player wishes to continue play. For example, the player may be prompted to take an action (e.g., to press a button) within a predetermined period of time. If the player wishes to continue play, the process returns to step 410. If not, the process ends. (Step 455.)

Figure 8:
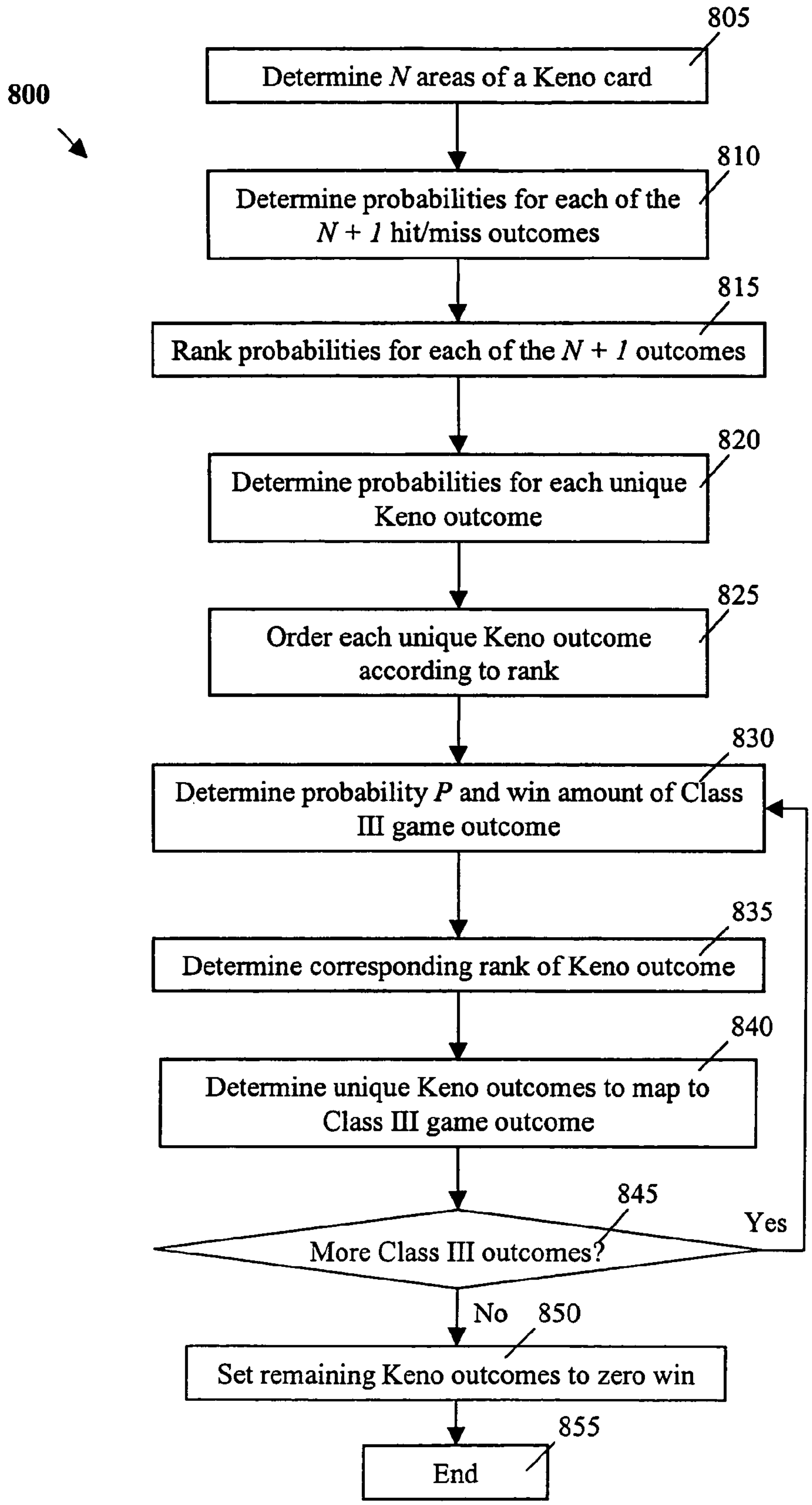
FIG. 8 is a flow chart that outlines another method of the invention.

Some aspects of the present invention provide sensible and efficient methods for mapping Keno outcomes to outcomes of other games, such as slot games, poker games or other Class III games. Some such aspects will now be discussed with reference to method 800 of FIG. 8. As with other method of the invention, the steps of method 800 are not necessarily performed in the order indicated. In step 805, N areas of a Keno card are determined, as described above. In this example, N=20.

Method 800 is implemented for Keno games in which, as previously discussed, a player may select only one Keno number in each of the N areas. In each of the N areas, there are only 2 possible outcomes: either the player's selected number will be picked or it will not. When N is 20, there are 21 such "hit/miss" outcomes. One is that none of the 20 areas will have a hit. Therefore, the "zero hit" outcome must be counted along with each other possibility (1 hit, 2 hits, . . . 20 hits).

Moreover, the odds of a particular number of "hits" are the same, regardless of which of the N areas are hit. For example, even though each combination of 3 hits is an unique outcome, the probability of getting 3 hits is the same regardless of which 3 of the 20 areas get hit. Accordingly, even though there are $2^{20}-1$ unique Keno outcomes, given a random 20-ball drop, there are only N+1 different probabilities of hit/miss outcomes for Keno games according to the present invention.

Accordingly, in step 810, the probabilities of each of the N+1 different hit/miss outcomes are determined. In this example, the probabilities determined in step 805 are then ranked, in order to allow a more convenient mapping of Keno outcomes to the outcomes of another game. The probability of each unique Keno outcome is determined in step 820 and in step 825, each of the unique outcomes is associated with one of the N+1 different hit/miss outcomes.

Aggregating the $2^{20}-1$ unique Keno outcomes into N+1 different hit/miss outcomes greatly simplifies the process of mapping Keno outcomes to outcomes of another game. For example, when N=20, the entire Keno card can be represented as a bit field having 20 ones and zeroes. Ones represent hits and zeroes represent "no hit." This process allows a simplification of Keno outcomes and an easier mapping of Keno outcomes to slot outcomes, poker outcomes, etc.

In step 830, a probability and a win amount of a Class III game outcome is determined, e.g., by reading these values from a pay table. For example, a slot outcome of "3 cherries" may pay 2 units and have a probability of 0.02.

In step 835, a corresponding rank of Keno outcomes is determined. This step is desirable (though not, strictly speaking, necessary) in order to have some logical relationship between the Keno outcomes and the outcomes of the Class III game. For example, if the associated Class III outcome is a high-payout, low-probability outcome (e.g., a Royal Flush), the Keno outcome should also be a low-probability outcome (e.g., 20 hits). In this example, it is determined that a 3-hit outcome has a corresponding rank with the selected Class III outcome.

In step 840, a plurality of unique Keno outcomes are mapped to the selected Class III game outcome. The probability of any one unique Keno outcome will be quite small. Let's suppose that the probability of obtaining an unique "3-spot hit" outcome is 0.0001. We have C(20,3)=1140 different 3-spot hit outcomes. The sum of the probabilities of various individual outcomes is the total probability of obtaining any of these outcomes. Accordingly, out the total number of 3-spot hit outcomes, we choose 200 of them as 2-unit winners, because 200*0.0001=0.02

In step 845, we determine that there are more Class III outcomes because the process has only begun. Then, we perform a mapping for the next slot outcome, which happens to have a win amount of 3 units and a probability of 0.006. We determine in step 835 that the same rank of Keno outcomes ("3-spot hit" outcomes) may be used as in the previous step. Therefore, we choose 60 more of the "3-spot hit" outcomes: 60*0.0001=0.006.

Then, we keeps going through the Class III paytable until all the win amounts have corresponding Keno outcomes such that, when their probabilities are summed, the resulting probability matches (or nearly matches) the pay table probability corresponding to that win. Because we have $2^{20}-1$ unique outcomes, we have a lot of granularity and therefore can get very close to the exact total probability for each Class III game outcome. The outcomes not used will have their win amount set to zero. (Step 850.) Then, method 800 ends. (Step 855.)

Gaming Machine

Figure 9:
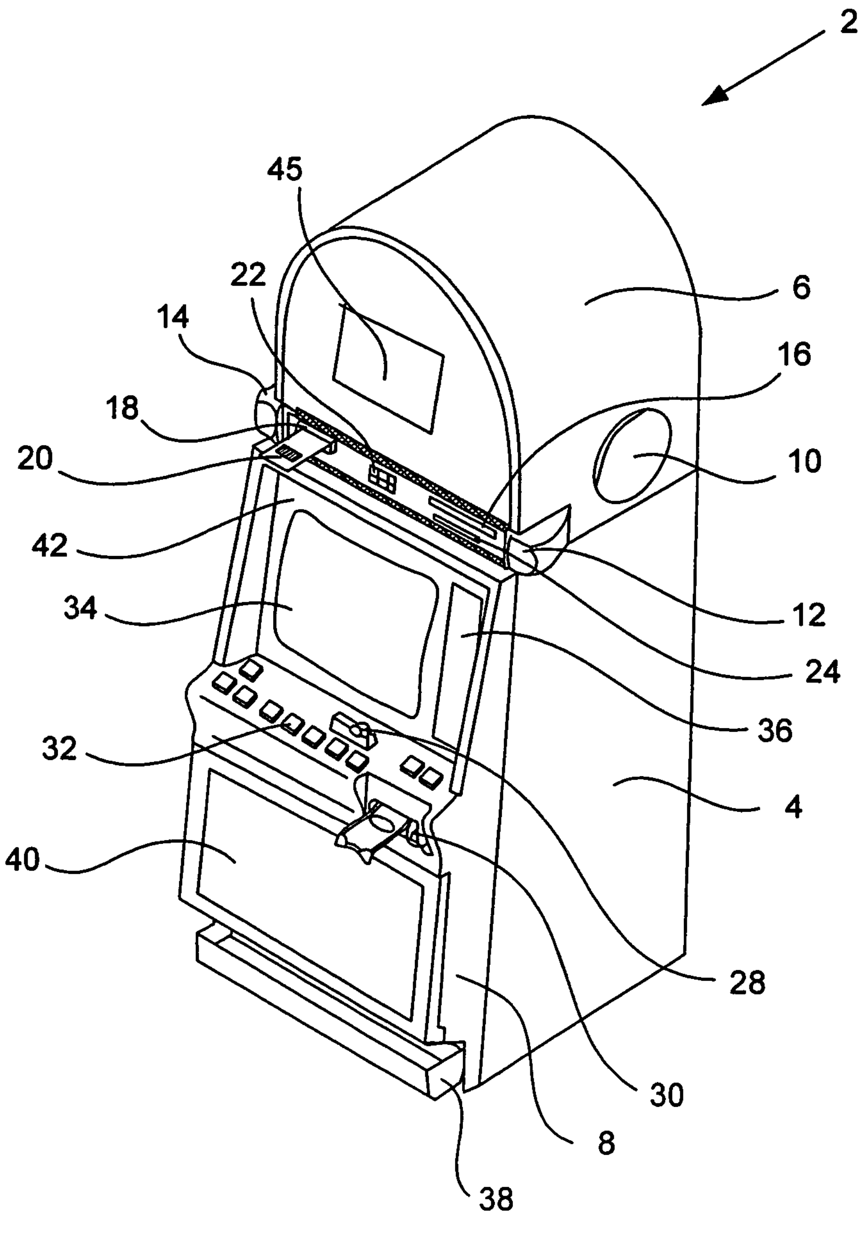
FIG. 9 illustrates a gaming machine that may be configured according to some aspects of the invention.

Turning next to FIG. 9, a video gaming machine 2 of the present invention is shown. Machine 2 includes a main cabinet 4, which generally surrounds the machine interior (not shown) and is viewable by users. The main cabinet includes a main door 8 on the front of the machine, which opens to provide access to the interior of the machine. Attached to the main door are player-input switches or buttons 32, a coin acceptor 28, and a bill validator 30, a coin tray 38, and a belly glass 40. Viewable through the main door is a video display monitor 34 and an information panel 36. The display monitor 34 will typically be a cathode ray tube, high resolution flat-panel LCD, or other conventional electronically controlled video monitor. The information panel 36 may be a back-lit, silk screened glass panel with lettering to indicate general game information including, for example, a game denomination (e.g. $0.25 or $1). The bill validator 30, player-input switches 32, video display monitor 34, and information panel are devices used to play a game on the game machine 2. The devices are controlled by circuitry (e.g. the master gaming controller) housed inside the main cabinet 4 of the machine 2.

Many different types of games, including mechanical slot games, video slot games, video poker, video black jack, video pachinko and lottery, may be provided with gaming machines of this invention. In particular, the gaming machine 2 may be operable to provide a play of many different instances of games of chance. The instances may be differentiated according to themes, sounds, graphics, type of game (e.g., slot game vs. card game), denomination, number of paylines, maximum jackpot, progressive or non-progressive, bonus games, etc. The gaming machine 2 may be operable to allow a player to select a game of chance to play from a plurality of instances available on the gaming machine. For example, the gaming machine may provide a menu with a list of the instances of games that are available for play on the gaming machine and a player may be able to select from the list a first instance of a game of chance that they wish to play.

The various instances of games available for play on the gaming machine 2 may be stored as game software on a mass storage device in the gaming machine or may be generated on a remote gaming device but then displayed on the gaming machine. The gaming machine 2 may executed game software, such as but not limited to video streaming software that allows the game to be displayed on the gaming machine. When an instance is stored on the gaming machine 2, it may be loaded from the mass storage device into a RAM for execution. In some cases, after a selection of an instance, the game software that allows the selected instance to be generated may be downloaded from a remote gaming device, such as another gaming machine.

Figure 1:
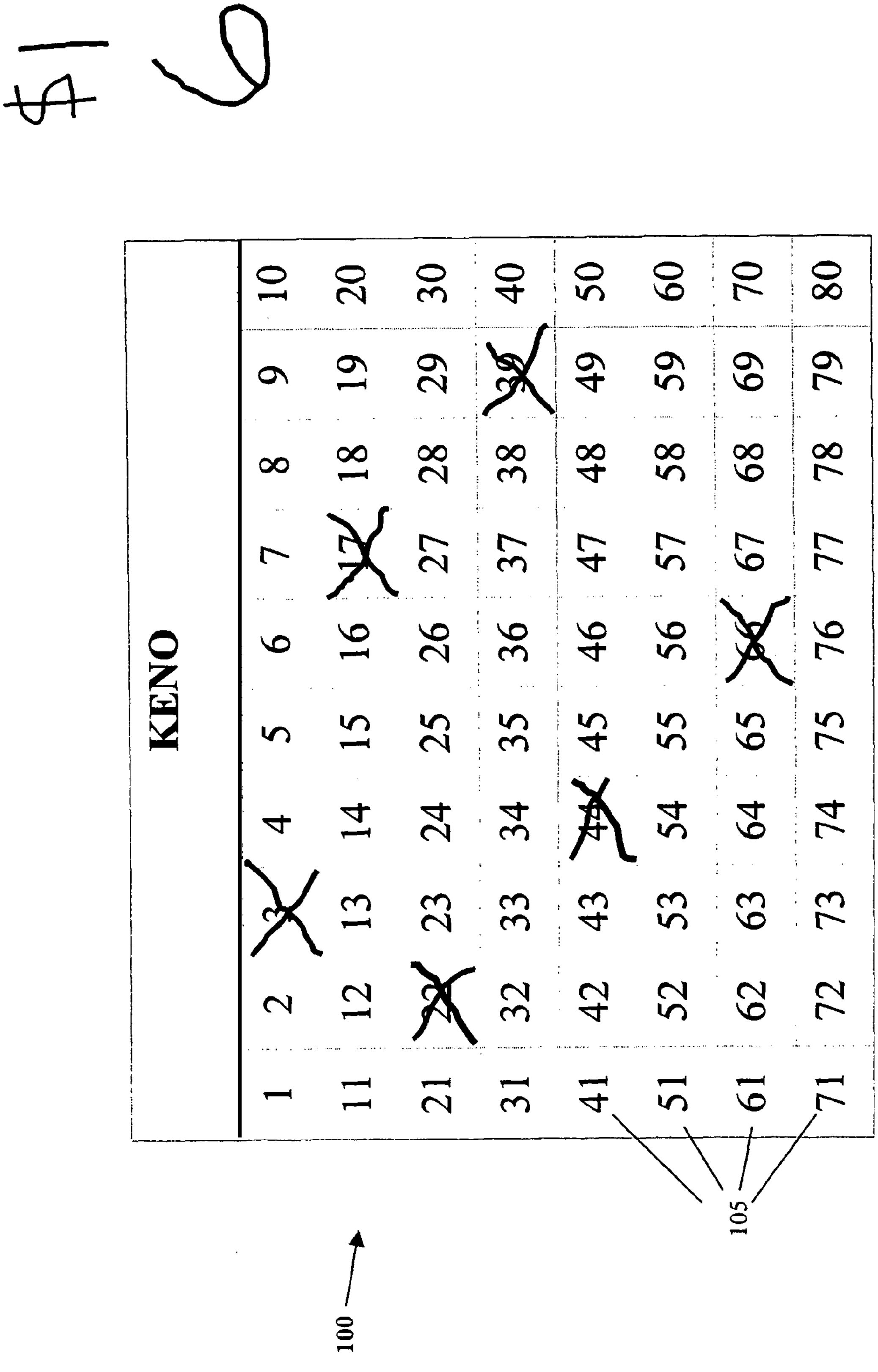
FIG. 1 illustrates one example of a Keno card.
Figure 2:
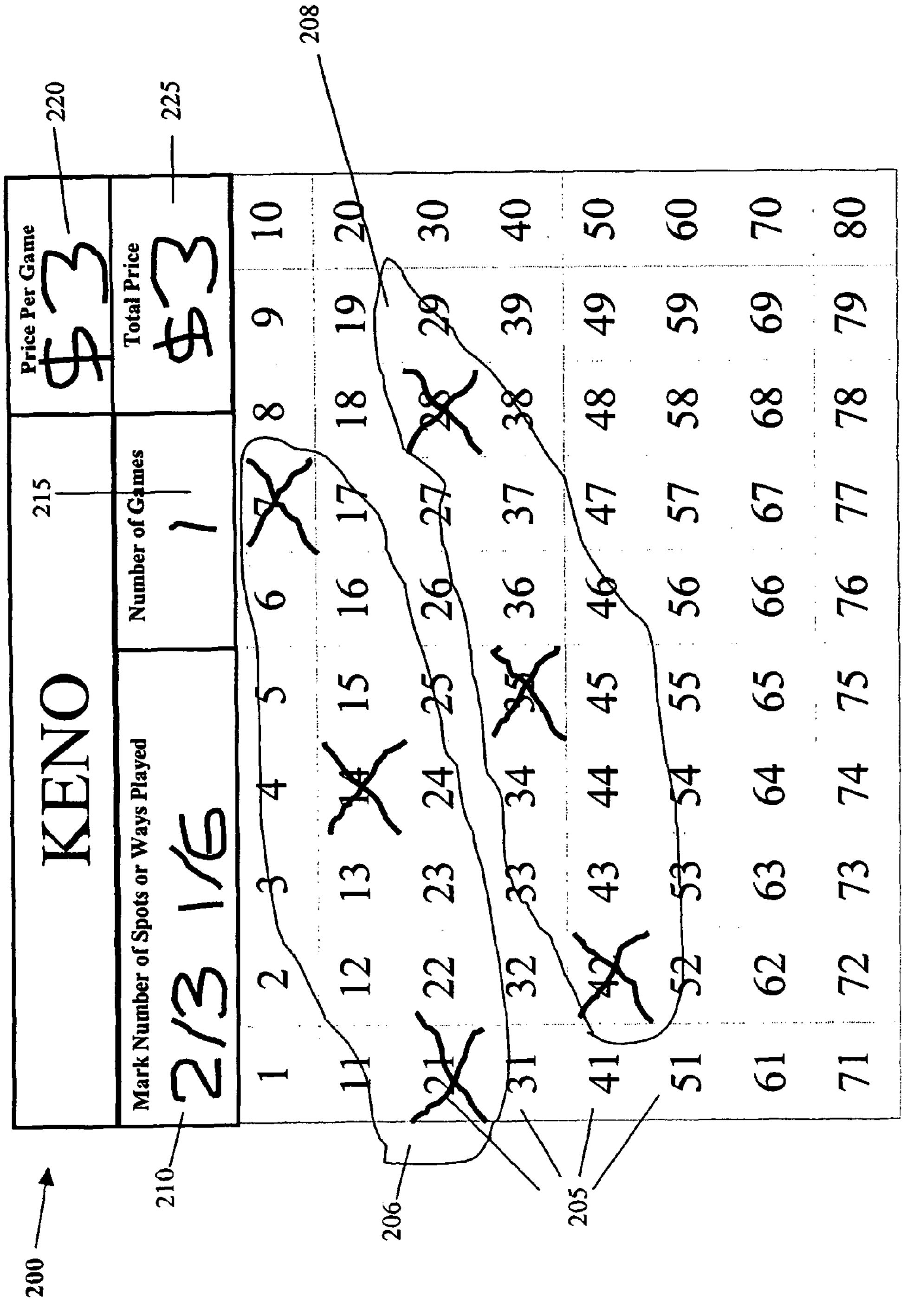
FIG. 2 illustrates another example of a Keno card.

The gaming machine 2 includes a top box 6, which sits on top of the main cabinet 4. The top box 6 houses a number of devices, which may be used to add features to a game being played on the gaming machine 2, including speakers 10, 12, 14, a ticket printer 18 which prints bar-coded tickets 20, a key pad 22 for entering player tracking information, a florescent display 16 for displaying player tracking information, a card reader 24 for entering a magnetic striped card containing player tracking information, and a video display screen 42. The ticket printer 18 may be used to print tickets for a cashless ticketing system. Further, the top box 6 may house different or additional devices than shown in the FIG. 1. For example, the top box may contain a bonus wheel or a back-lit silk screened panel which may be used to add bonus features to the game being played on the gaming machine. As another example, the top box may contain a display for a progressive jackpot offered on the gaming machine. During a game, these devices are controlled and powered, in part, by circuitry (e.g. a master gaming controller) housed within the main cabinet 4 of the machine 2.

Understand that gaming machine 2 is but one example from a wide range of gaming machine designs on which the present invention may be implemented. For example, not all suitable gaming machines have top boxes or player tracking features. Further, some gaming machines have only a single game display—mechanical or video, while others are designed for bar tables and have displays that face upwards. As another example, a game may be generated in on a host computer and may be displayed on a remote terminal or a remote gaming device. The remote gaming device may be connected to the host computer via a network of some type such as a local area network, a wide area network, an intranet or the Internet. The remote gaming device may be a portable gaming device such as but not limited to a cell phone, a personal digital assistant, and a wireless game player. Images rendered from 3-D gaming environments may be displayed on portable gaming devices that are used to play a game of chance. Further a gaming machine or server may include gaming logic for commanding a remote gaming device to render an image from a virtual camera in a 3-D gaming environments stored on the remote gaming device and to display the rendered image on a display located on the remote gaming device. Thus, those of skill in the art will understand that the present invention, as described below, can be deployed on most any gaming machine now available or hereafter developed.

Some preferred gaming machines of the present assignee are implemented with special features and/or additional circuitry that differentiates them from general-purpose computers (e.g., desktop PC's and laptops). Gaming machines are highly regulated to ensure fairness and, in many cases, gaming machines are operable to dispense monetary awards of multiple millions of dollars. Therefore, to satisfy security and regulatory requirements in a gaming environment, hardware and software architectures may be implemented in gaming machines that differ significantly from those of general-purpose computers. A description of gaming machines relative to general-purpose computing machines and some examples of the additional (or different) components and features found in gaming machines are described below.

At first glance, one might think that adapting PC technologies to the gaming industry would be a simple proposition because both PCs and gaming machines employ microprocessors that control a variety of devices. However, because of such reasons as 1) the regulatory requirements that are placed upon gaming machines, 2) the harsh environment in which gaming machines operate, 3) security requirements and 4) fault tolerance requirements, adapting PC technologies to a gaming machine can be quite difficult. Further, techniques and methods for solving a problem in the PC industry, such as device compatibility and connectivity issues, might not be adequate in the gaming environment. For instance, a fault or a weakness tolerated in a PC, such as security holes in software or frequent crashes, may not be tolerated in a gaming machine because in a gaming machine these faults can lead to a direct loss of funds from the gaming machine, such as stolen cash or loss of revenue when the gaming machine is not operating properly.

For the purposes of illustration, a few differences between PC systems and gaming systems will be described. A first difference between gaming machines and common PC based computers systems is that gaming machines are designed to be state-based systems. In a state-based system, the system stores and maintains its current state in a non-volatile memory, such that, in the event of a power failure or other malfunction the gaming machine will return to its current state when the power is restored. For instance, if a player was shown an award for a game of chance and, before the award could be provided to the player the power failed, the gaming machine, upon the restoration of power, would return to the state where the award is indicated. As anyone who has used a PC, knows, PCs are not state machines and a majority of data is usually lost when a malfunction occurs. This requirement affects the software and hardware design on a gaming machine.

A second important difference between gaming machines and common PC based computer systems is that for regulation purposes, the software on the gaming machine used to generate the game of chance and operate the gaming machine has been designed to be static and monolithic to prevent cheating by the operator of gaming machine. For instance, one solution that has been employed in the gaming industry to prevent cheating and satisfy regulatory requirements has been to manufacture a gaming machine that can use a proprietary processor running instructions to generate the game of chance from an EPROM or other form of non-volatile memory. The coding instructions on the EPROM are static (non-changeable) and must be approved by a gaming regulators in a particular jurisdiction and installed in the presence of a person representing the gaming jurisdiction. Any changes to any part of the software required to generate the game of chance, such as adding a new device driver used by the master gaming controller to operate a device during generation of the game of chance can require a new EPROM to be burnt, approved by the gaming jurisdiction and reinstalled on the gaming machine in the presence of a gaming regulator. Regardless of whether the EPROM solution is used, to gain approval in most gaming jurisdictions, a gaming machine must demonstrate sufficient safeguards that prevent an operator or player of a gaming machine from manipulating hardware and software in a manner that gives them an unfair and some cases an illegal advantage. The gaming machine should have a means to determine if the code it will execute is valid. If the code is not valid, the gaming machine must have a means to prevent the code from being executed. The code validation requirements in the gaming industry affect both hardware and software designs on gaming machines.

A third important difference between gaming machines and common PC based computer systems is the number and kinds of peripheral devices used on a gaming machine are not as great as on PC based computer systems. Traditionally, in the gaming industry, gaming machines have been relatively simple in the sense that the number of peripheral devices and the number of functions the gaming machine has been limited. Further, in operation, the functionality of gaming machines were relatively constant once the gaming machine was deployed, i.e., new peripherals devices and new gaming software were infrequently added to the gaming machine. This differs from a PC where users will go out and buy different combinations of devices and software from different manufacturers and connect them to a PC to suit their needs depending on a desired application. Therefore, the types of devices connected to a PC may vary greatly from user to user depending in their individual requirements and may vary significantly over time.

Although the variety of devices available for a PC may be greater than on a gaming machine, gaming machines still have unique device requirements that differ from a PC, such as device security requirements not usually addressed by PCs. For instance, monetary devices, such as coin dispensers, bill validators and ticket printers and computing devices that are used to govern the input and output of cash to a gaming machine have security requirements that are not typically addressed in PCs. Therefore, many PC techniques and methods developed to facilitate device connectivity and device compatibility do not address the emphasis placed on security in the gaming industry.

To address some of the issues described above, a number of hardware/software components and architectures are utilized in gaming machines that are not typically found in general purpose computing devices, such as PCs. These hardware/software components and architectures, as described below in more detail, include but are not limited to watchdog timers, voltage monitoring systems, state-based software architecture and supporting hardware, specialized communication interfaces, security monitoring and trusted memory.

A watchdog timer is normally used in IGT gaming machines to provide a software failure detection mechanism. In a normally operating system, the operating software periodically accesses control registers in the watchdog timer subsystem to "re-trigger" the watchdog. Should the operating software fail to access the control registers within a preset timeframe, the watchdog timer will timeout and generate a system reset. Typical watchdog timer circuits contain a loadable timeout counter register to allow the operating software to set the timeout interval within a certain range of time. A differentiating feature of the some preferred circuits is that the operating software cannot completely disable the function of the watchdog timer. In other words, the watchdog timer always functions from the time power is applied to the board.

IGT gaming computer platforms preferably use several power supply voltages to operate portions of the computer circuitry. These can be generated in a central power supply or locally on the computer board. If any of these voltages falls out of the tolerance limits of the circuitry they power, unpredictable operation of the computer may result. Though most modem general-purpose computers include voltage monitoring circuitry, these types of circuits only report voltage status to the operating software. Out of tolerance voltages can cause software malfunction, creating a potential uncontrolled condition in the gaming computer. Gaming machines of the present assignee typically have power supplies with tighter voltage margins than that required by the operating circuitry. In addition, the voltage monitoring circuitry implemented in IGT gaming computers typically has two thresholds of control. The first threshold generates a software event that can be detected by the operating software and an error condition generated. This threshold is triggered when a power supply voltage falls out of the tolerance range of the power supply, but is still within the operating range of the circuitry. The second threshold is set when a power supply voltage falls out of the operating tolerance of the circuitry. In this case, the circuitry generates a reset, halting operation of the computer.

The standard method of operation for IGT slot machine game software is to use a state machine. Different functions of the game (bet, play, result, points in the graphical presentation, etc.) may be defined as a state. When a game moves from one state to another, critical data regarding the game software is stored in a custom non-volatile memory subsystem. This is critical to ensure the player's wager and credits are preserved and to minimize potential disputes in the event of a malfunction on the gaming machine.

In general, the gaming machine does not advance from a first state to a second state until critical information that allows the first state to be reconstructed is stored. This feature allows the game to recover operation to the current state of play in the event of a malfunction, loss of power, etc that occurred just prior to the malfunction. After the state of the gaming machine is restored during the play of a game of chance, game play may resume and the game may be completed in a manner that is no different than if the malfunction had not occurred. Typically, battery backed RAM devices are used to preserve this critical data although other types of non-volatile memory devices may be employed. These memory devices are not used in typical general-purpose computers.

As described in the preceding paragraph, when a malfunction occurs during a game of chance, the gaming machine may be restored to a state in the game of chance just prior to when the malfunction occurred. The restored state may include metering information and graphical information that was displayed on the gaming machine in the state prior to the malfunction. For example, when the malfunction occurs during the play of a card game after the cards have been dealt, the gaming machine may be restored with the cards that were previously displayed as part of the card game. As another example, a bonus game may be triggered during the play of a game of chance where a player is required to make a number of selections on a video display screen. When a malfunction has occurred after the player has made one or more selections, the gaming machine may be restored to a state that shows the graphical presentation at the just prior to the malfunction including an indication of selections that have already been made by the player. In general, the gaming machine may be restored to any state in a plurality of states that occur in the game of chance that occurs while the game of chance is played or to states that occur between the play of a game of chance.

Game history information regarding previous games played such as an amount wagered, the outcome of the game and so forth may also be stored in a non-volatile memory device. The information stored in the non-volatile memory may be detailed enough to reconstruct a portion of the graphical presentation that was previously presented on the gaming machine and the state of the gaming machine (e.g., credits) at the time the game of chance was played. The game history information may be utilized in the event of a dispute. For example, a player may decide that in a previous game of chance that they did not receive credit for an award that they believed they won. The game history information may be used to reconstruct the state of the gaming machine prior, during and/or after the disputed game to demonstrate whether the player was correct or not in their assertion.

Another feature of gaming machines, such as IGT gaming computers, is that they often contain unique interfaces, including serial interfaces, to connect to specific subsystems internal and external to the slot machine. The serial devices may have electrical interface requirements that differ from the "standard" EIA 232 serial interfaces provided by general-purpose computers. These interfaces may include EIA 485, EIA 422, Fiber Optic Serial, optically coupled serial interfaces, current loop style serial interfaces, etc. In addition, to conserve serial interfaces internally in the slot machine, serial devices may be connected in a shared, daisy-chain fashion where multiple peripheral devices are connected to a single serial channel.

The serial interfaces may be used to transmit information using communication protocols that are unique to the gaming industry. For example, IGT's Netplex is a proprietary communication protocol used for serial communication between gaming devices. As another example, SAS is a communication protocol used to transmit information, such as metering information, from a gaming machine to a remote device. Often SAS is used in conjunction with a player tracking system.

IGT gaming machines may alternatively be treated as peripheral devices to a casino communication controller and connected in a shared daisy chain fashion to a single serial interface. In both cases, the peripheral devices are preferably assigned device addresses. If so, the serial controller circuitry must implement a method to generate or detect unique device addresses. General-purpose computer serial ports are not able to do this.

Security monitoring circuits detect intrusion into an IGT gaming machine by monitoring security switches attached to access doors in the slot machine cabinet. Preferably, access violations result in suspension of game play and can trigger additional security operations to preserve the current state of game play. These circuits also function when power is off by use of a battery backup. In power-off operation, these circuits continue to monitor the access doors of the slot machine. When power is restored, the gaming machine can determine whether any security violations occurred while power was off, e.g., via software for reading status registers. This can trigger event log entries and further data authentication operations by the slot machine software.

Trusted memory devices are preferably included in an IGT gaming machine computer to ensure the authenticity of the software that may be stored on less secure memory subsystems, such as mass storage devices. Trusted memory devices and controlling circuitry are typically designed to not allow modification of the code and data stored in the memory device while the memory device is installed in the slot machine. The code and data stored in these devices may include authentication algorithms, random number generators, authentication keys, operating system kernels, etc. The purpose of these trusted memory devices is to provide gaming regulatory authorities a root trusted authority within the computing environment of the slot machine that can be tracked and verified as original. This may be accomplished via removal of the trusted memory device from the slot machine computer and verification of the secure memory device contents is a separate third party verification device. Once the trusted memory device is verified as authentic, and based on the approval of the verification algorithms contained in the trusted device, the gaming machine is allowed to verify the authenticity of additional code and data that may be located in the gaming computer assembly, such as code and data stored on hard disk drives. A few details related to trusted memory devices that may be used in the present invention are described in U.S. Pat. No. 6,685,567 from U.S. patent application Ser. No. 09/925,098, filed Aug. 8, 2001 and titled "Process Verification," which is incorporated herein in its entirety and for all purposes.

Mass storage devices used in a general purpose computer typically allow code and data to be read from and written to the mass storage device. In a gaming machine environment, modification of the gaming code stored on a mass storage device is strictly controlled and would only be allowed under specific maintenance type events with electronic and physical enablers required. Though this level of security could be provided by software, IGT gaming computers that include mass storage devices preferably include hardware level mass storage data protection circuitry that operates at the circuit level to monitor attempts to modify data on the mass storage device and will generate both software and hardware error triggers should a data modification be attempted without the proper electronic and physical enablers being present.

Returning to the example of FIG. 9, when a user wishes to play the gaming machine 2, he or she inserts cash through the coin acceptor 28 or bill validator 30. Additionally, the bill validator may accept a printed ticket voucher which may be accepted by the bill validator 30 as an indicia of credit when a cashless ticketing system is used. At the start of the game, the player may enter playing tracking information using the card reader 24, the keypad 22, and the florescent display 16. Further, other game preferences of the player playing the game may be read from a card inserted into the card reader. During the game, the player views game information using the video display 34. Other game and prize information may also be displayed in the video display screen 42 located in the top box.

During the course of a game, a player may be required to make a number of decisions, which affect the outcome of the game. For example, a player may vary his or her wager on a particular game, select a prize for a particular game selected from a prize server, or make game decisions which affect the outcome of a particular game. The player may make these choices using the player-input switches 32, the video display screen 34 or using some other device which enables a player to input information into the gaming machine. In some embodiments, the player may be able to access various game services such as concierge services and entertainment content services using the video display screen 34 and one more input devices.

During certain game events, the gaming machine 2 may display visual and auditory effects that can be perceived by the player. These effects add to the excitement of a game, which makes a player more likely to continue playing. Auditory effects include various sounds that are projected by the speakers 10, 12, 14. Visual effects include flashing lights, strobing lights or other patterns displayed from lights on the gaming machine 2 or from lights behind the belly glass 40. After the player has completed a game, the player may receive game tokens from the coin tray 38 or the ticket 20 from the printer 18, which may be used for further games or to redeem a prize. Further, the player may receive a ticket 20 for food, merchandise, or games from the printer 18.

Gaming Networks

Many implementations of the present invention may advantageously be practiced via a gaming machine network. Some such networks are described in U.S. patent application Ser. No. 11/225,407, by Wolf et al., entitled "METHODS AND DEVICES FOR MANAGING GAMING NETWORKS" and filed Sep. 12, 2005, which is incorporated herein by reference in its entirety and for all purposes.

Figure 10:
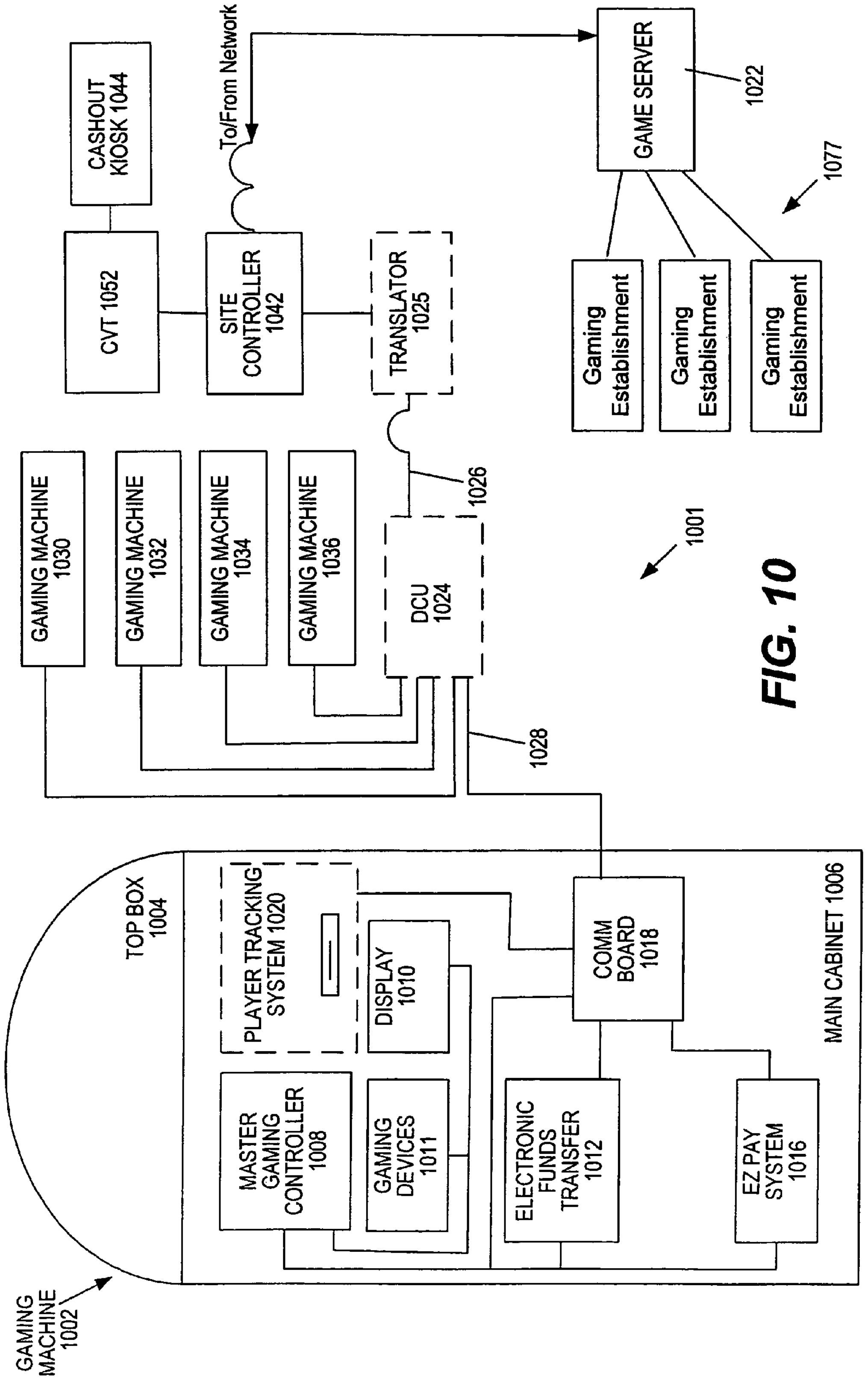
FIG. 10 illustrates a gaming machine and a gaming network that may be configured according to some aspects of the invention.

Another gaming network that may be used to implement some aspects of the invention is depicted in FIG. 10. Gaming establishment 1001 could be any sort of gaming establishment, such as a casino, a card room, an airport, a store, etc. In this example, gaming network 1077 includes more than one gaming establishment, all of which are networked to game server 1022.

Here, gaming machine 1002, and the other gaming machines 1030, 1032, 1034, and 1036, include a main cabinet 1006 and a top box 1004. The main cabinet 1006 houses the main gaming elements and can also house peripheral systems, such as those that utilize dedicated gaming networks. The top box 1004 may also be used to house these peripheral systems.

The master gaming controller 1008 controls the game play on the gaming machine 1002 according to instructions and/or game data from game server 1022 or stored within gaming machine 1002 and receives or sends data to various input/output devices 1011 on the gaming machine 1002. In one embodiment, master gaming controller 1008 includes processor(s) and other apparatus of the gaming machines described above in FIGS. 6 and 7. The master gaming controller 1008 may also communicate with a display 1010.

A particular gaming entity may desire to provide network gaming services that provide some operational advantage. Thus, dedicated networks may connect gaming machines to host servers that track the performance of gaming machines under the control of the entity, such as for accounting management, electronic fund transfers (EFTs), cashless ticketing, such as EZPay™, marketing management, and data tracking, such as player tracking. Therefore, master gaming controller 1008 may also communicate with EFT system 1012, EZPay™ system 1016 (a proprietary cashless ticketing system of the present assignee), and player tracking system 1020. The systems of the gaming machine 1002 communicate the data onto the network 1022 via a communication board 1018.

It will be appreciated by those of skill in the art that embodiments of the present invention could be implemented on a network with more or fewer elements than are depicted in FIG. 10. For example, player tracking system 1020 is not a necessary feature of some implementations of the present invention. However, player tracking programs may help to sustain a game player's interest in additional game play during a visit to a gaming establishment and may entice a player to visit a gaming establishment to partake in various gaming activities. Player tracking programs provide rewards to players that typically correspond to the player's level of patronage (e.g., to the player's playing frequency and/or total amount of game plays at a given casino). Player tracking rewards may be free meals, free lodging and/or free entertainment. Player tracking information may be combined with other information that is now readily obtainable by an SBG system.

Moreover, DCU 1024 and translator 1025 are not required for all gaming establishments 1001. However, due to the sensitive nature of much of the information on a gaming network (e.g., electronic fund transfers and player tracking data) the manufacturer of a host system usually employs a particular networking language having proprietary protocols. For instance, 10-20 different companies produce player tracking host systems where each host system may use different protocols. These proprietary protocols are usually considered highly confidential and not released publicly.

Further, gaming machines are made by many different manufacturers. The communication protocols on the gaming machine are typically hard-wired into the gaming machine and each gaming machine manufacturer may utilize a different proprietary communication protocol. A gaming machine manufacturer may also produce host systems, in which case their gaming machine are compatible with their own host systems. However, in a heterogeneous gaming environment, gaming machines from different manufacturers, each with its own communication protocol, may be connected to host systems from other manufacturers, each with another communication protocol. Therefore, communication compatibility issues regarding the protocols used by the gaming machines in the system and protocols used by the host systems must be considered.

A network device that links a gaming establishment with another gaming establishment and/or a central system will sometimes be referred to herein as a "site controller." Here, site controller 1042 provides this function for gaming establishment 1001. Site controller 1042 is connected to a central system and/or other gaming establishments via one or more networks, which may be public or private networks. Among other things, site controller 1042 communicates with game server 1022 to obtain game data, such as ball drop data, bingo card data, etc.

In the present illustration, gaming machines 1002, 1030, 1032, 1034 and 1036 are connected to a dedicated gaming network 1022. In general, the DCU 1024 functions as an intermediary between the different gaming machines on the network 1022 and the site controller 1042. In general, the DCU 1024 receives data transmitted from the gaming machines and sends the data to the site controller 1042 over a transmission path 1026. In some instances, when the hardware interface used by the gaming machine is not compatible with site controller 1042, a translator 1025 may be used to convert serial data from the DCU 1024 to a format accepted by site controller 1042. The translator may provide this conversion service to a plurality of DCUs.

Further, in some dedicated gaming networks, the DCU 1024 can receive data transmitted from site controller 1042 for communication to the gaming machines on the gaming network. The received data may be, for example, communicated synchronously to the gaming machines on the gaming network.

Here, CVT 1052 provides cashless and cashout gaming services to the gaming machines in gaming establishment 1001. Broadly speaking, CVT 1052 authorizes and validates cashless gaming machine instruments (also referred to herein as "tickets" or "vouchers"), including but not limited to tickets for causing a gaming machine to display a game result and cash-out tickets. Moreover, CVT 1052 authorizes the exchange of a cashout ticket for cash. These processes will be described in detail below. In one example, when a player attempts to redeem a cash-out ticket for cash at cashout kiosk 1044, cash out kiosk 1044 reads validation data from the cashout ticket and transmits the validation data to CVT 1052 for validation. The tickets may be printed by gaming machines, by cashout kiosk 1044, by a stand-alone printer, by CVT 1052, etc. Some gaming establishments will not have a cashout kiosk 1044. Instead, a cashout ticket could be redeemed for cash by a cashier (e.g. of a convenience store), by a gaming machine or by a specially configured CVT.

Some methods of the invention combine information that can be obtained from game network accounting systems with features described above. By combining, for example, information regarding scheduled gaming machine configurations and information regarding the amount of money that a gaming machine brings in while a gaming machine has a particular configuration, gaming machine configurations may be optimized to maximize revenue. Some such methods involve determining a first rate of revenue obtained by a gaming machine in the gaming network during a first time when the gaming machine has a first configuration. The gaming machine is later automatically configured according to second configuration information supplied by the SBG server, e.g., as scheduled by the Scheduler. A second rate of revenue, obtained by the gaming machine during a second time when the gaming machine has the second configuration, is determined, and so on.

After scheduling various configurations at various times, optimum configurations for the gaming machine may be determined for various times of day. The SBG system can them provide scheduled optimal configurations for the gaming machine at the corresponding times of day. Some implementations provide for groups (e.g., banks) of gaming machines to be automatically configured according to a predetermined schedule of optimal configurations for various times of day, days of the week, times of the year, etc.

In some such implementations, an average revenue may be computed, based on revenue from many gaming machines having the same configuration at the same time of day. These average revenues could be used to determine an overall optimal value for relevant time periods.

Figure 11:
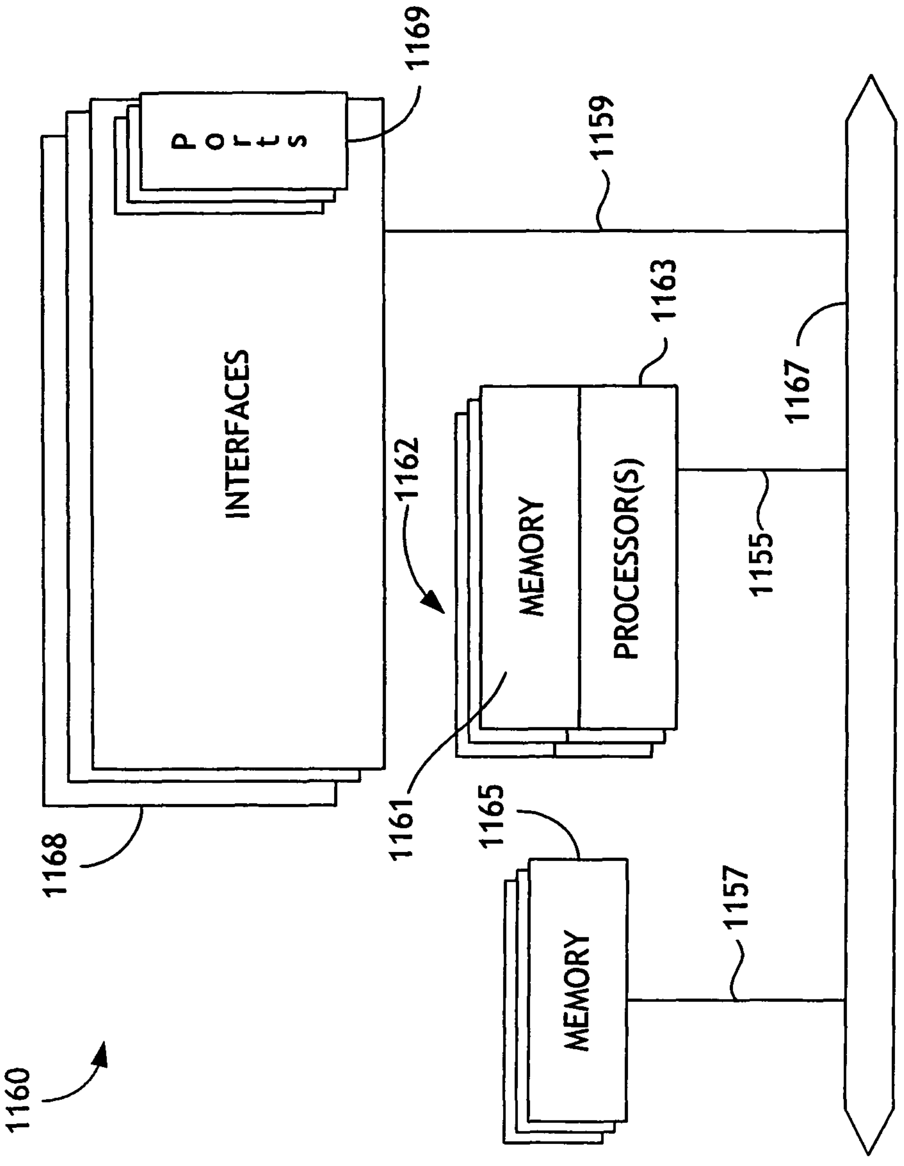
FIG. 11 illustrates a network device that may be configured according to some aspects of the invention.

FIG. 11 illustrates an example of a network device that may be configured for implementing some methods of the present invention. Network device 1160 includes a master central processing unit (CPU) 1162, interfaces 1168, and a bus 1167 (e.g., a PCI bus). Generally, interfaces 1168 include ports 1169 appropriate for communication with the appropriate media. In some embodiments, one or more of interfaces 1168 includes at least one independent processor and, in some instances, volatile RAM. The independent processors may be, for example, ASICs or any other appropriate processors. According to some such embodiments, these independent processors perform at least some of the functions of the logic described herein. In some embodiments, one or more of interfaces 1168 control such communications-intensive tasks as encryption, decryption, compression, decompression, packetization, media control and management. By providing separate processors for the communications-intensive tasks, interfaces 1168 allow the master microprocessor 1162 efficiently to perform other functions such as routing computations, network diagnostics, security functions, etc.

The interfaces 1168 are typically provided as interface cards (sometimes referred to as "linecards"). Generally, interfaces 1168 control the sending and receiving of data packets over the network and sometimes support other peripherals used with the network device 1160. Among the interfaces that may be provided are FC interfaces, Ethernet interfaces, frame relay interfaces, cable interfaces, DSL interfaces, token ring interfaces, and the like. In addition, various very high-speed interfaces may be provided, such as fast Ethernet interfaces, Gigabit Ethernet interfaces, ATM interfaces, HSSI interfaces, POS interfaces, FDDI interfaces, ASI interfaces, DHEI interfaces and the like.

When acting under the control of appropriate software or firmware, in some implementations of the invention CPU 1162 may be responsible for implementing specific functions associated with the functions of a desired network device. According to some embodiments, CPU 1162 accomplishes all these functions under the control of software including an operating system and any appropriate applications software.

CPU 1162 may include one or more processors 1163 such as a processor from the Motorola family of microprocessors or the MIPS family of microprocessors. In an alternative embodiment, processor 1163 is specially designed hardware for controlling the operations of network device 1160. In a specific embodiment, a memory 1161 (such as non-volatile RAM and/or ROM) also forms part of CPU 1162. However, there are many different ways in which memory could be coupled to the system. Memory block 1161 may be used for a variety of purposes such as, for example, caching and/or storing data, programming instructions, etc.

Regardless of network device's configuration, it may employ one or more memories or memory modules (such as, for example, memory block 1165) configured to store data, program instructions for the general-purpose network operations and/or other information relating to the functionality of the techniques described herein. The program instructions may control the operation of an operating system and/or one or more applications, for example.

Because such information and program instructions may be employed to implement the systems/methods described herein, the present invention relates to machine-readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media; and hardware devices that are specially configured to store and perform program instructions, such as read-only memory devices (ROM) and random access memory (RAM). The invention may also be embodied in a carrier wave traveling over an appropriate medium such as airwaves, optical lines, electric lines, etc. Examples of program instructions include both machine code, such as produced by a compiler, and files containing higher-level code that may be executed by the computer using an interpreter.

Although the system shown in FIG. 11 illustrates one specific network device of the present invention, it is by no means the only network device architecture on which the present invention can be implemented. For example, an architecture having a single processor that handles communications as well as routing computations, etc. is often used. Further, other types of interfaces and media could also be used with the network device. The communication path between interfaces may be bus based (as shown in FIG. 11) or switch fabric based (such as a cross-bar).

While this invention is described in terms of preferred embodiments, there are alterations, permutations, and equivalents that fall within the scope of the invention. It should also be noted that there are many alternative ways of implementing the present invention. It is therefore intended that the invention not be limited to the preferred embodiments described herein, but instead that the invention should be interpreted as including all such alterations, permutations, and equivalents as fall within the true spirit and scope of the present invention.

I claim:

1. A machine-readable medium having program instructions stored thereon for controlling one or more devices to perform the following tasks:

determining N areas of a Keno card for a Keno game in which players are not permitted to select more than one number in each of the N areas, wherein each area in the N areas includes a plurality of numbers from which the number for the area is selected;

determining a probability for each unique Keno outcome of the Keno game;

determining a first pay table probability corresponding to a first win amount and a first outcome of a pay table for a second game;

selecting a first plurality of unique Keno outcomes whose total probability is approximately equal to the first pay table probability; and mapping the first plurality of unique Keno outcomes to the first win amount and the first outcome of the pay table for the second game.

2. The machine-readable medium of claim 1, wherein the pay table for the second game comprises O outcomes, further comprising program instructions for controlling one or more devices to perform the following tasks:

determining $2^{nd}$ through O pay table probabilities corresponding to $2^{nd}$ through O win amounts and $2^{nd}$ through O outcomes of the pay table for the second game;

selecting $2^{nd}$ through O pluralities of unique Keno outcomes whose total probabilities are approximately equal to the corresponding $2^{nd}$ through O pay table probabilities; and mapping the $2^{nd}$ through O pluralities of unique Keno outcomes to the $2^{nd}$ through O win amounts and the $2^{nd}$ through O outcomes of the pay table for the second game.

3. The machine-readable medium of claim 1, further comprising program instructions for controlling one or more devices to perform the following tasks:

determining a hit/miss probability for each of N+1 hit/miss outcomes, each hit/miss outcome corresponding to a condition of having a hit or a miss on 0 through N of the areas of the Keno card; and organizing the probabilities for the unique Keno outcomes according to the N+1 hit/miss outcomes.

4. The machine-readable medium of claim 1, wherein the second game is a slot game or a video poker game.

5. The machine-readable medium of claim 1, wherein each unique Keno outcome of the first plurality of unique Keno outcomes has approximately the same probability.

6. The machine-readable medium of claim 2, further comprising program instructions for controlling one or more devices to perform the following tasks:

determining unmapped unique Keno outcomes that were not mapped to win amounts of the second game; and assigning the unmapped unique Keno outcomes to zero win amounts for the second game.

7. The machine-readable medium of claim 3, further comprising program instructions for controlling one or more devices to rank the N+1 hit/miss outcomes according to their relative probability.

8. The machine-readable medium of claim 7, wherein the selecting task comprises selecting the first plurality of unique Keno outcomes from a rank that corresponds with a relative probability of the first outcome of the second game.

9. A machine-implemented gaming method, comprising:

providing a Keno game wherein a Keno card is automatically presented, the Keno card being divided into N areas, wherein each area in the N areas includes a plurality of numbers;

receiving an indication from a user interface that a number has been selected from the plurality of numbers included in each area of the N areas, wherein no more than one number is selectable for each of the N areas;

determining an outcome of the Keno game; and automatically displaying a second game outcome that corresponds with the outcome of the Keno game, wherein the second game outcome is a non-Keno game outcome.

10. The method of claim 9, wherein the Keno game and the second game are provided on a gaming machine.

11. The method of claim 9, wherein the second game is a slot game.

12. The method of claim 9, wherein the second game is a video poker game.

13. The method of claim 9, wherein one number is automatically selected in each of the N areas.

14. The method of claim 9, wherein N is one of 10, 16 or 20.

15. Software stored in a machine-readable medium, the software including instructions for controlling a gaming machine to perform the following steps:

providing a Keno game wherein a Keno card is divided into N areas and a number is selected in each of the N areas, wherein each area in the N areas includes a plurality of numbers from which the number for the area is selected and no more than one number is selectable in each area; and displaying a second game outcome that corresponds with an outcome of the Keno game, wherein the second game outcome is a non-Keno game outcome.

16. A gaming machine, comprising:

means for providing a Keno game wherein a Keno card is divided into N areas, wherein each area in the N areas includes a plurality of numbers;

means for selecting a number from the plurality of numbers included in each of the N areas, wherein no more than one number is selectable in each area;

means for determining an outcome of a Keno game; and means for displaying a second game outcome that corresponds with the outcome of the Keno game, wherein the second game outcome is a non-Keno game outcome.

17. A gaming machine, comprising:

a credit-accepting device for accepting indicia of credit;

at least one display device;

at least one input device; and a logic device configured to perform the following steps after receiving an indication from the credit-accepting device indicating that sufficient indicia of credit have been received:

control a display device to:

present a Keno card, prompt a player to choose one Keno number in each of N areas of the Keno card, and indicate chosen Keno numbers on the Keno card, wherein each area in the N areas includes a plurality of numbers from which the number for the area is selected and no more than one number is selectable in each area;

determine a Keno game outcome and a corresponding outcome of a second game of chance;

control a display device to indicate Keno numbers of the Keno game outcome on the Keno card; and control a display device to indicate the corresponding outcome of the second game of chance.

18. The gaming machine of claim 17, wherein an input device is configured to allow a player to choose one Keno number in each of the N areas of the Keno card.

19. The gaming machine of claim 17, wherein the logic device is configured to randomly choose one Keno number in each of the N areas of the Keno card and wherein an input device is configured to allow a player to instruct the logic device to automatically choose one Keno number in each of the N areas of the Keno card.

20. The gaming machine of claim 17, wherein the second game of chance is one of a slot game or a poker game.

21. The gaming machine of claim 17, wherein the at least one display device comprises a first display device and a second display device, wherein the Keno card is displayed on the first display device and wherein the second game of chance is displayed on the second display device.

* * * * *

UNITED STATES PATENT AND TRADEMARK OFFICE

CERTIFICATE OF CORRECTION

PATENT NO. : 8,500,544 B2
APPLICATION NO. : 11/339234
DATED : August 6, 2013
INVENTOR(S) : Lesley Bienvenue It is certified that error appears in the above-identified patent and that said Letters Patent is hereby corrected as shown below:

IN THE CLAIMS

In Claim 2, Column 18, Line 19, between “controlling” and “one” insert --the--.
In Claim 3, Column 18, Line 33, between “controlling” and “one” insert --the--.
In Claim 6, Column 18, Line 47, between “controlling” and “one” insert --the--.
In Claim 7, Column 18, Line 54, between “controlling” and “one” insert --the--.
In Claim 7, Column 18, Line 56, replace “probability” with --probabilities--.
In Claim 14, Column 19, Line 16, replace “or” with --and--.
In Claim 16, Column 19, Line 36, replace “a” with --the--.
In Claim 17, Column 20, Line 9, replace “a” with --the at least one--.
In Claim 17, Column 20, Line 13, between “indicate” and “chosen” insert --the--.
In Claim 17, Column 20, Lines 19 and 22, replace both instances of “a” with --the at least one--.
In Claim 18, Column 20, Line 23, replace “an” with --the at least one--.
In Claim 18, Column 20, Line 24, replace “a” with --the--.
In Claim 19, Column 20, Line 28, replace “an” with --the at least one--.
In Claim 19, Column 20, Line 29, replace “a” with --the--.
In Claim 20, Column 20, Line 33, replace “or” with --and--.

Signed and Sealed this
Sixth Day of May, 2014

Michelle K. Lee

Michelle K. Lee
*Deputy Director of the United States Patent and Trademark Office*

UNITED STATES PATENT AND TRADEMARK OFFICE

CERTIFICATE OF CORRECTION

PATENT NO. : 8,500,544 B2
APPLICATION NO. : 11/339234
DATED : August 6, 2013
INVENTOR(S) : Bienvenue et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1921 days.

Signed and Sealed this
Twenty-fourth Day of February, 2015

Michelle K. Lee
*Deputy Director of the United States Patent and Trademark Office*